United States Patent [19]
Bastian et al.

[11] Patent Number: 4,964,339
[45] Date of Patent: Oct. 23, 1990

[54] MULTIPLE STAGE ROCKET PROPELLED MISSILE SYSTEM

[75] Inventors: Thomas W. Bastian, Placentia; Charles W. Schertz, Bakersfield, both of Calif.

[73] Assignee: General Dynamics Corp., Pomona Division, Pomona, Calif.

[21] Appl. No.: 137,226

[22] Filed: Dec. 23, 1987

[51] Int. Cl.$^5$ .............................................. F42B 15/00
[52] U.S. Cl. ...................................... 102/376; 102/377
[58] Field of Search ............... 102/374, 376, 377, 489; 244/3.1, 3.22

[56] References Cited

U.S. PATENT DOCUMENTS

| | | | |
|---|---|---|---|
| 2,402,809 | 6/1946 | Farr | 60/255 |
| 2,423,453 | 7/1947 | Howe | 102/374 |
| 2,462,099 | 2/1949 | Hickman | 102/374 |
| 2,519,878 | 8/1950 | Bjork et al. | 60/255 |
| 2,644,364 | 7/1953 | Nass | 102/376 X |
| 2,755,620 | 7/1956 | Gillot | 60/35.6 |
| 2,853,946 | 9/1958 | Loedding | 102/374 |
| 2,968,244 | 1/1961 | Maas, Jr. et al. | 102/374 |
| 3,118,377 | 1/1964 | Davies et al. | 102/374 |
| 3,167,016 | 1/1965 | Czerwinski et al. | 102/489 |
| 3,191,379 | 6/1965 | Pierce | 102/285 X |
| 3,377,952 | 4/1968 | Crockett | 102/489 |
| 3,412,681 | 11/1968 | Schirneker | 102/438 |
| 3,491,692 | 1/1970 | Blankenagel | 102/489 |
| 3,749,334 | 7/1973 | McCorkle, Jr. | 244/3.22 |
| 3,754,507 | 8/1973 | Dillinger et al. | 102/374 |
| 3,754,511 | 8/1973 | Damon et al. | 102/102 |
| 3,758,052 | 9/1973 | McAlexander et al. | 244/3.14 |
| 3,780,968 | 12/1973 | Parilla | 244/3.22 |
| 3,806,064 | 4/1974 | Parilla | 244/3.22 |
| 3,903,802 | 9/1975 | Squiers | 102/376 |
| 4,502,649 | 3/1985 | Botwin et al. | 244/3.1 |
| 4,766,726 | 8/1988 | Tackett et al. | 102/374 |

FOREIGN PATENT DOCUMENTS

| | | | |
|---|---|---|---|
| 1052450 | 4/1902 | France | 102/374 |
| 1125958 | 4/1902 | France | 102/374 |

Primary Examiner—Deborah L. Kyle
Assistant Examiner—Michael J. Carone
Attorney, Agent, or Firm—Neil Martin; Leo R. Carroll

[57] ABSTRACT

A rocket propelled missile assembly comprises an outer casing defining an internal solid rocket propellant chamber, the casing having an opening at its forward end aligned with an internal tube submerged in the rocket propellant chamber, and at least one exhaust nozzle at its rear end for venting exhaust gases from the propellant chamber. Solid propellant is contained within the propellant chamber surrounding the internal tube, and a separate terminal stage missile is partially or fully submerged in the tube with the capacity to separate from the tube forwardly through the front end of the casing. The missile separates from the remainder of the system on booster burn out.

11 Claims, 1 Drawing Sheet

MULTIPLE STAGE ROCKET PROPELLED MISSILE SYSTEM

BACKGROUND OF THE INVENTION

The present invention relates generally to rocket propelled missiles or other rocket propelled payloads.

Surface or air launched missiles are generally propelled by suitable solid rocket booster motors, which may be integral with the missile body or separate from it, so that they can be launched at a safe distance from a target. Separable "boost" propulsion "stages" are preferable for longer range missiles because kinematic efficiency is gained by discarding the weight and drag associated with a boost motor casing after propellant burn out. Separable rocket booster motors comprise a suitable casing for containing solid propellant grains which are ignited and burned to propel the missile and a separation mechanism for discarding the casing after propellant depletion. These may be strapped onto a missile body in a side by side arrangement or may be secured in line (tandem) behind the missile body. The latter arrangement significantly increases the length and bulk of the complete missile assembly comprising both the missile and propellant motor or motors, requiring a corresponding increase in the dimensions of a launching vehicle.

One tandem missile configuration is shown in U.S. Pat. No. 3,780,968 of Parilla, for example, where a generally conical outer casing contains a warhead at its forward end and first and second stage rocket motors behind the warhead and guidance system. The casing is in separate parts so that the first and second stage motors can successively separate from the warhead after burn out.

U.S. Pat. No. 2,968,244 of Maas, Jr. et al. shows a side by side arrangement o missile and booster rockets. In this arrangement a missile is contained within an outer casing with separate individual rocket motors arranged around the missile. This arrangement, though decreasing the axial length of the system, increases the overall mass which must be carried to the target and disintigrated since the rocket motors are not separable from the payload after burn out.

In U.S. Pat. Nos. 2,402,809; 2,462,099; and 2,519,878 self propelled rocket projectiles are shown in which an explosive charge is carried in the forward end of an outer casing and suitable propellant motors are carried in the rear end of the casing. To ensure that the entire casing will be shattered on explosion of the main projectile, a burster tube extends into the rear end portion of the casing and contains some explosive charge. This arrangement again has the disadvantage of increased axial length and mass which must be launched and propelled to the target.

SUMMARY OF THE INVENTION

It is an object of the present invention to provide a more efficient and compact arrangement for packaging a final stage missile with a solid rocket motor booster.

According to the present arrangement a rocket propelled missile arrangement is provided which comprises an outer boost motor casing defining an internal propellant chamber, an internal tube within the propellant chamber, the internal tube and outer casing being open at their forward ends, propellant within the propellant chamber surrounding the internal tube, and a separate terminal stage missile submerged at least partially within the internal tube and projecting out through its open forward end, the arrangement including suitable ignition devices for igniting and burning the propellant, the outer casing having at least one exhaust nozzle at its rear end for exhaust gases, and a suitable reactive force device for separating the missile from the outer casing on burn out of the propellant. The terminal stage missile will typically contain a warhead, guidance and control systems, and may contain a final stage propulsion system.

The internal tube for housing the missile may extend either the full length of the propellant chamber and be open at both ends, or extend only partially along the propellant chamber with a closed aft inner end. It will be of a material strong and thick enough to withstand the external booster motor chamber pressure surrounding it. More than one internal tube may be provided for containing multiple submissiles in a "double barrel shotgun" arrangement.

The internal propellant chamber may be a single chamber or may comprise two or more chambers separated by suitable interchamber pressure bulkheads, with the propellant in each chamber ignited in sequence. In the latter case the internal tube will extend through a first part of the chamber for containing sustain propellant grain, with a pressure bulkhead separating the first part of the chamber from a second, rear part containing boost propellant, the bulkhead containing suitable nozzles for venting the sustain grain gas flow after the booster propellant is expended. This has the advantage that the internal tube does not have to withstand such high external pressures as generated by the booster propellant and can therefore be of a thinner and lighter design.

This arrangement of a small diameter terminal stage missile at least partially submerged within a larger diameter "conformal" outer booster reduces the overall length of the assembly, making it more compact for firing from a suitable launch device. The missile is also protected from the aeroheating environment during boost.

BRIEF DESCRIPTION OF THE DRAWINGS

The present invention will be better understood from the following detailed description of some preferred embodiments of the invention, taken in conjunction with the accompanying drawings in which like reference numerals refer to like parts, and in which.

DESCRIPTION OF THE PREFERRED EMBODIMENTS

Figure 1:
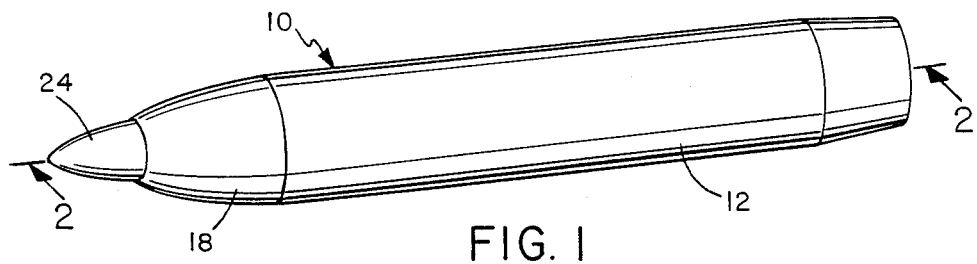
FIG. 1 is a perspective view of the exterior of a multi stage rocket propelled missile assembly according to a preferred embodiment of the present invention.
Figure 2:
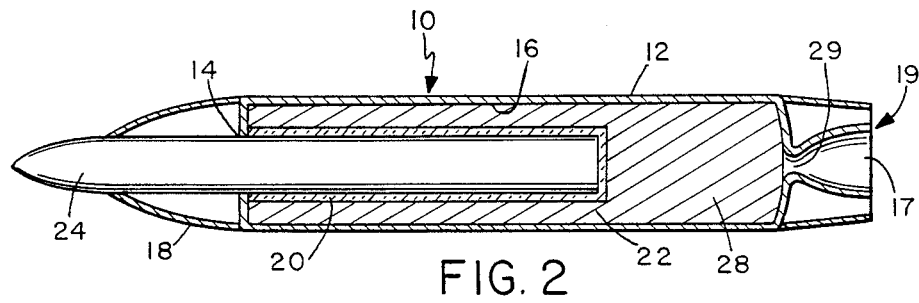
FIG. 2 is a sectional view on the lines 2—2 of FIG. 1.
Figure 3:
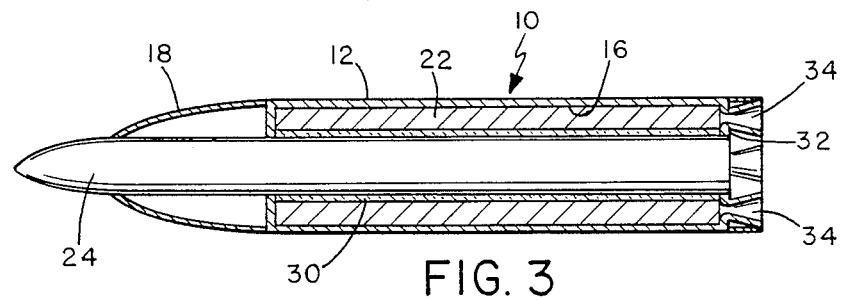
FIG. 3 is a sectional view similar to FIG. 2 showing an alternative arrangement of the internal solid rocket booster.
Figure 4:
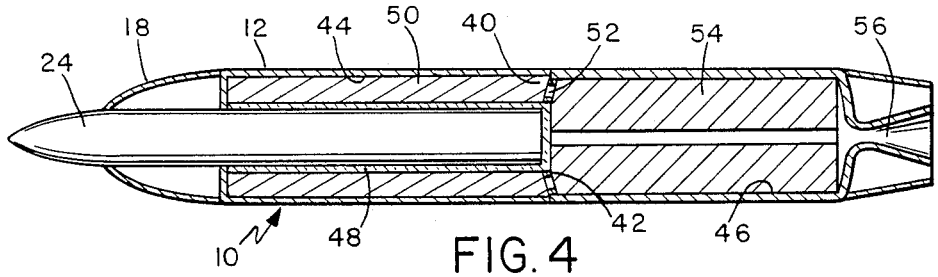
FIG. 4 is another view similar to FIG. 2 showing another alternative arrangement.

Referring first to FIGS. 1 and 2 of the drawings, a rocket propelled missile arrangement 10 according to a first embodiment of the present invention is shown. FIGS. 3 and 4 show modified internal arrangements, the exterior arrangement of the system in each of these cases being similar or identical to that shown in FIG. 1.

The arrangement 10 comprises an outer casing 12 having an opening 14 at its forward end and defining an internal propellant chamber 16. Chamber 16 has at least one exhaust nozzle 17 at its rear end for venting exhaust gases from the chamber through the open rear end of casing 12. The casing 12 may be an integral tubular casing or be made up of several parts suitably connected together as indicated in the drawings. In the illustrated embodiments, casing 12 comprises a generally tubular central portion containing the propellant chamber and boost motor, and a suitable aerodynamic fairing 18 of generally conical shape at the forward end of the tubular portion.

An internal tube 20 is submerged in the propellant chamber and is surrounded by suitable propellant grain 22 contained within the propellant chamber. In the arrangement shown in FIG. 2 the tube 20 extends axially from the forward end of the central axis of the chamber along part of the length of the chamber, and is open at its forward end only. A separate terminal stage missile 24 is carried in the tube 20 and projects through the open forward end of the tube and through the aerodynamic fairing at the forward end of the outer casing as shown in the drawings. In alternative arrangements (not shown), the missile 24 need not project out of the open forward end of the fairing 18 but may simply be enclosed within it.

The missile 24 comprises an outer structure of suitable aerodynamic shape containing a suitable warhead, control and guidance system, and possibly a second stage propulsion system. These components are of a standard nature and will therefore not be described in any further detail. Any suitable design of final stage missile with the potential of its own propulsion devices may be utilized in the system.

In the arrangement shown in FIG. 2 the booster motor is concentric and conforms in shape with the central missile carried in the tube along part of the length of the outer booster motor casing 12. The booster motor in FIG. 2 has a full cross section plenum 28 located behind the central tube which exhausts through centrally located throat 29 and exhaust nozzle 17 out of the open rear end of casing 12. A suitable conventional control and ignition system (not shown) will be provided for igniting the booster propellant 22.

The use of a plenum chamber behind the concentric booster section simplifies the rocket motor throat and nozzle, since a single central nozzle can be used. The ability to use a single nozzle reduces cost and reduces the chance of thrust misalignment as compared to multiple nozzle or plug cowl designs.

Once the propellant 22 is exhausted, the missile 24 separates from the outer casing by suitably propelling it through the open forward end of the tube 20 and aligned forward opening 14 of the casing. The propelling devices may be contained within the missile casing or externally within the rear end of tube 20.

In the arrangement shown in FIG. 2, the internal missile carrying tube 20 must be strong enough to withstand the external pressure of the booster chamber, and is preferably insulated to protect the missile from booster motor combustion heat. The maximum expected operating pressure (MEOP) will be calculated for the booster rocket motor, and a suitable tube material and thickness will be chosen which is sufficient to withstand this MEOP multiplied by a suitable factor at safety. The internal diameter of the tube 20 and the diameter of the open forward end of casing 12 are chosen to be a close fit with the external diameter of missile 24, with sufficient clearance to ensure that the missile can be propelled freely out of the casing 12 on exhaustion of the propellant 22.

In one specific example in which the MEOP is 2000 p.s.i., a steel tube of mean radius 4.125 inches with a minimum wall thickness of 0.275 inches may be used. In another example, a titanium inner tube of 4.2 mean inches radius and 0.33 inches wall thickness may be used. Other materials and wall thickness may be chosen within the limitations of the MEOP and minimum expected material strength.

This arrangement therefore combines a large diameter booster with a small diameter terminal stage missile in a minimal or reduced overall system length by submerging the missile at least partially within a tube mounted down the center of the booster.

FIG. 3 shows a modified arrangement, in which the missile carrying tube 30 extends the full length of the booster or propellant chamber 16. The tube 30 is preferably open at both ends in this embodiment, as shown. The chamber has an annular aft closure plate or bulkhead 32 containing multiple spaced exhaust nozzles 34 for venting exhaust gases through the open rear end of outer casing 12. Two, three, four or more such exhaust nozzles 34 may be used. In this arrangement the missile 24 extends the full length of the boost chamber, decreasing the overall length of the system over that shown in FIG. 2. However, multiple exhaust nozzles must be used with this arrangement. Again the tube 30 must be designed to withstand motor combustion heat and the maximum expected operating pressures of the annular boost motor surrounding it. The arrangement is otherwise the same as that shown in FIG. 2 and like reference numerals have been used for like parts.

FIG. 4 illustrates another modification in which a dual propellant chamber is provided. The propellant chamber 40 in this arrangement is divided by a pressure bulkhead 42 into a forward, sustain chamber 44 and a rear, boost chamber 46. The central, missile carrying tube 48 is submerged in the sustain chamber 44. A suitable sustain propellant 50 surrounds the tube 48, and the bulkhead 42 contains suitable exhaust nozzles or flow ports 52, which are normally closed by suitable blow out plugs or cover plates (not shown). The rear chamber 46 contains the main boost propellant grain 54 and has a single, central rear exhaust opening 56 which vents boost gases through the open rear end of casing 12 during the first stage of rocket propulsion. The arrangement is otherwise the same as that shown in FIG. 2 and like reference numerals have been used for like parts.

In the arrangement shown in FIG. 4, the pressure bulkhead 42 isolates the sustain grain and missile carrying tube from the boost chamber so that they are not exposed to the high boost chamber pressures. After the boost propellant is expended, the sustain grain is ignited and the flow ports are blown open to vent the sustain grain gas flow. Thus the inner tube does not have to withstand such high maximum expected operating pressures as the missile carrying tubes of the previous embodiments, and can be of thinner and lighter construction designed to withstand the lower maximum expected operating pressure of the sustain section of the booster rocket motor.

Another advantage of the arrangement shown in FIG. 4 is that the pressure bulkhead serves as a structural support for the aft end of the submerged tube, eliminating the potential cantilever of the design shown in FIG. 2.

In another modification (not illustrated), more than one tube may be submerged in the propellant chamber in any of the three arrangements described above, the two or more side by side submerged tubes being arranged symmetrically around the center axis of the outer housing. Each tube will house a terminal stage submissile in a "double barrel shotgun" arrangement. Each tube would be aligned with a suitable opening in the forward end of the outer casing. The outer booster would then act as a submunition dispensing bus vehicle.

A multiple payload device may be staged, for example, to allow one vehicle to engage multiple independent targets, or may be used to cover a larger area of uncertainty than single payload vehicles.

In all of the above arrangements a more compact and efficient rocket propelled missile assembly is provided by submerging a small diameter final stage missile at least partially in a tube embedded in a larger diameter solid rocket motor booster. In the embodiment shown in the drawings, the small diameter final stage missile is combined with a concentric, conformal outer booster motor by surbmerging the missile at least partially into a tube mounted down the center of the booster motor. This reduces the length as compared to a conventional tandem booster, and protects the second stage missile from the aeroheating environment during boost.

This approach also has all the advantages of a staged missile, for example reduction in weight and drag after booster burn out. In the embodiments of FIGS. 2 and 4 having a rear plenum chamber, only a single rocket motor throat and nozzle is required, simplifying the design and reducing cost. These designs also reduce the risk of thrust misalignment.

Although some preferred embodiments of the invention have been described above by way of example only, it will be understood by those skilled in the field that modifications may be made to the disclosed embodiments without departing from the scope of the invention, which is defined by the appended claims.

We claim:

1. A rocket propelled missile assembly, comprising:
    a boost motor having an outer casing defining a propellant chamber having a forward end within said casing and a rear end, the rear end of the propellant chamber having at leas one exhaust nozzle for venting exhaust gases from the propellant chamber, the casing having an aerodynamic fairing projection forwardly from the forward end of the propellant chamber, the fairing having an opening at its forward end;
    a hollow tubular member of smaller diameter than said propellant chamber contained within said propellant chamber and having an open forward end aligned with the opening at the forward end of the fairing;
    propellant material contained within said propellant chamber surrounding said tubular member and extending up to the outer wall of said tubular member;
    a separate, final stage missile at least partially housed within said tubular member;
    said tubular member comprising means for insulating said missile from boost motor propellant heat and for isolating said missile from boost motor propellant gases until burn out of the propellant material.

2. The assembly as claimed in claim 1, wherein said missile projects forwardly through the open forward ends of said tube and said fairing.

3. The assembly as claimed in claim 1, wherein said tubular member projects along part of the length of said chamber and has a closed inner end.

4. The assembly as claimed in claim 3, wherein said tubular member extends centrally along the axis of said chamber.

5. The assembly as claimed in claim 3, wherein the chamber has a single central exhaust opening at its rear end, and the propellant material surrounds the tubular member and extends between the rear end of the tubular member and the exhaust opening in a full diameter plenum area.

6. The assembly as claimed in claim 1, wherein said tubular member has a predetermined wall thickness sufficient to withstand the maximum expected operating pressure of the boost motor.

7. The assembly as claimed in claim 6, wherein the wall thickness is no less than 0.275 inches.

8. The assembly as claimed in claim 2, wherein the fairing is shaped to conform with the shape of the missile at its forward end.

9. A rocket propelled missile assembly comprising:
    a boost motor having an outer casing defining an internal propellant chamber having a forward end within said casing and rear end, the rear end of the propellant chamber having at least one exhaust nozzle for venting exhaust gases from the propellant chamber, the casing having an opening at the forward end of the outer casing;
    a hollow tubular member of smaller diameter than said propellant chamber contained within said propellant chamber and extending the full length of the propellant chamber, the tube having an open forward end aligned with the opening at the forward end of the outer casing;
    propellant material contained within said propellant chamber surrounding said tubular member; and
    a separate, final stage missile at least partially housed within said tube;
    said tubular member comprising means for insulating said missile from boost motor propellant heat.

10. The assembly as claimed in claim 9, wherein the tubular member extends axially along the center of the chamber, and the chamber has an annular end wall surrounding the rear end of the tubular member at the rear end of the chamber, the end wall having a plurality of exhaust nozzles spaced around it for venting exhaust gases from the chamber.

11. A rocket propelled missile assembly, comprising:
    a boost motor having an outer casing defining an internal propellant chamber having a forward end within said casing and a rear end, the rear end of the propellant chamber having at least one exhaust nozzle for venting exhaust gases from the propellant chamber, the casing having an opening at its forward end;
    a hollow tubular member of smaller diameter than said propellant chamber contained within said propellant chamber and having an open forward end aligned with the opening at the forward end of the outer casing;
    propellant material contained within said propellant chamber surrounding said tubular member;
    a separate, final stage missile at least partially housed within said tube;

said tubular member comprising means for insulating said missile from boost motor propellant heat; and the propellant chamber having an internal bulkhead separating a forward part of the chamber from a rearward part of the chamber, the internal tube extending through the forward part of the chamber and being supported on the bulkhead at its rear end, the rear part of the chamber containing boost propellant material for providing primary propulsion to said assembly, the forward part of the chamber containing sustain propellant surrounding the tube for providing additional propulsion when the boost propellant is expended, and the bulkhead having normally closed nozzles for opening to vent sustain propellant exhaust gases on exhaustion of the boost propellant.

* * * * *